United States Patent
Berry, Jr.

(10) Patent No.: US 7,882,856 B2
(45) Date of Patent: Feb. 8, 2011

(54) SEPARATED SANITARY AND STORM SEWER SYSTEM

(76) Inventor: E. Wynn Berry, Jr., 1868 Carsons Cove, Commerce, MI (US) 48390

( * ) Notice: Subject to any disclaimer, the term of this patent is extended or adjusted under 35 U.S.C. 154(b) by 1205 days.

(21) Appl. No.: 11/235,639

(22) Filed: Sep. 26, 2005

(65) Prior Publication Data
US 2006/0016500 A1    Jan. 26, 2006

Related U.S. Application Data

(63) Continuation-in-part of application No. 10/790,471, filed on Mar. 1, 2004, now Pat. No. 7,021,338, which is a continuation-in-part of application No. 10/247,430, filed on Sep. 19, 2002, now Pat. No. 6,698,442.

(60) Provisional application No. 60/401,714, filed on Aug. 7, 2002.

(51) Int. Cl.
F16L 55/00 (2006.01)
(52) U.S. Cl. .................. 138/108; 138/116
(58) Field of Classification Search .......... 138/106, 138/112, 116
See application file for complete search history.

(56) References Cited

U.S. PATENT DOCUMENTS

| | | | | |
|---|---|---|---|---|
| 384,860 | A * | 6/1888 | Meehan | 138/108 |
| 2,686,643 | A * | 8/1954 | Bloom et al. | 248/49 |
| 3,366,339 | A | 1/1968 | Fair | |
| 3,417,785 | A * | 12/1968 | Andrews | 138/108 |
| 3,503,425 | A * | 3/1970 | Holm | 138/108 |
| 3,525,685 | A * | 8/1970 | Edwards | 210/620 |
| 3,756,266 | A | 9/1973 | Artz | |
| 3,863,679 | A | 2/1975 | Young | |
| 4,373,838 | A | 2/1983 | Foreman et al. | |
| 4,806,705 | A | 2/1989 | Chen | |
| 5,018,260 | A | 5/1991 | Ziu | |
| 5,083,885 | A | 1/1992 | Ushitora et al. | |
| 5,161,911 | A | 11/1992 | Regan | |
| 5,480,260 | A | 1/1996 | Shattuck et al. | |

(Continued)

OTHER PUBLICATIONS

McPherson, M.B., "*ACSE Combined Sewer Separation Project Progress*", Oct. 16, 1967, ASCE Nat'l Meeting on Water Resources Engg., pp. 1-21, New York, NY.

(Continued)

*Primary Examiner*—James F Hook
(74) *Attorney, Agent, or Firm*—Fraser Clemens Martin & Miller LLC; William J. Clemens (57) ABSTRACT

An apparatus and method for improving the operation of sewer systems includes a first sewer pipe connected to a source of other water and a second smaller diameter sewer pipe passing through the first sewer pipe and connected to sources of sanitary effluent. The second sewer pipe can be attached to the interior surfaces of the first sewer line by a curable adhesive material using a removable inflatable bladder to hold the second sewer pipe in position until the adhesive has cured sufficiently. As an alternative, positioning walls or arms, integral with the second pipe, form positioning spaces filled with a slurry material to hold the second sewer pipe in position. The slurry will harden in place to form an integral unit with the second pipe and the positioning walls or arms.

14 Claims, 11 Drawing Sheets

U.S. PATENT DOCUMENTS

| | | | |
|---|---|---|---|
| 5,575,304 | A | 11/1996 | Hassett |
| 5,791,378 | A * | 8/1998 | Stephens ................. 138/98 |
| 5,890,837 | A | 4/1999 | Wells |
| 5,902,656 | A * | 5/1999 | Hwang ................. 428/36.91 |
| 6,001,212 | A | 12/1999 | Polivka et al. |
| 6,311,730 | B2 | 11/2001 | Penza |
| 6,318,395 | B1 | 11/2001 | Anderson et al. |
| 6,406,216 | B1 | 6/2002 | Raasch |
| 6,463,960 | B1 | 10/2002 | Madhani et al. |
| 6,467,507 | B1 | 10/2002 | Engle |
| 6,564,831 | B1 * | 5/2003 | Sanoner et al. ............ 138/115 |
| 6,604,549 | B2 | 8/2003 | Gauthier et al. |
| 6,698,442 | B1 | 3/2004 | Berry, Jr. |
| 6,786,677 | B2 | 9/2004 | Finzel et al. |
| 7,004,681 | B2 * | 2/2006 | Penza ................. 405/183.5 |
| 7,021,338 | B2 * | 4/2006 | Berry, Jr. ................. 138/108 |
| 7,514,628 | B2 * | 4/2009 | Kadrnoska et al. ............ 174/24 |
| 2002/0033554 | A1 * | 3/2002 | Heagy et al. ................. 425/11 |
| 2002/0170612 | A1 | 11/2002 | Penza |
| 2003/0034080 | A1 | 2/2003 | Second |
| 2004/0146362 | A1 * | 7/2004 | Penza ................. 405/184.4 |
| 2005/0005986 | A1 * | 1/2005 | Topek et al. ............ 138/115 |
| 2005/0224123 | A1 * | 10/2005 | Baynham et al. ............ 138/106 |

OTHER PUBLICATIONS

ACSE Project Staff, Greely and Hansen, Consultants, "*American Society of Civil Engineers Combined Sewer Separation Project, Milwaukee Study Area*", Dec. 1968, pp. 1-54, Appendix A, B.

Farrell, R. Paul and Darrah, G. Grey, "*Pressure Sewers-A Proven Alternative Solution for a Variety of Small Community Sewage Disposal Challenges*", Dec. 11, 1994, American Society of Agricultural Engineers, Atlanta, GA.

Anderson, Greg, "*New Fiber-Optic Installation Method for Sewers Unveiled in Toronto*", Oct. 2003, Trenchless Technology, pp. 40-41.

* cited by examiner

SEPARATED SANITARY AND STORM SEWER SYSTEM

CROSS-REFERENCE TO RELATED APPLICATION

This application is a continuation-in-part of the U.S. patent application Ser. No. 10/790,471, filed Mar. 1, 2004, now U.S. Pat. No. 7,021,338, which is a continuation-in-part of the U.S. patent application Ser. No. 10/247,430, filed Sep. 19, 2002, now U.S. Pat. No. 6,698,442, which application claims the benefit of U.S. provisional patent application Ser. No. 60/401,714, filed Aug. 7, 2002.

BACKGROUND OF THE INVENTION

The present invention relates generally to an apparatus and a method for separating sanitary effluent from storm water and/or infiltrated water in a municipal sewer system.

Municipal sewer systems include a web of pipes that convey wastewater from homes, businesses and industries and storm water from drains to treatment plants. The smallest pipes, typically twelve inches in diameter or less, are know as "collectors" that are connected to service lines running to the sanitary plumbing of buildings. The collectors are connected to "trunk lines", typically larger than twelve inches in diameter, and carrying one to ten million gallons per day. The trunk lines connect to "interceptors" that carry the wastewater to a treatment plant. The interceptors are of large diameter, often more than ten feet.

The wastewater plumbing system in a typical house, office building or manufacturing facility combines toilet effluent with other wastewater, such as from sink and bath drains, to be carried by a single service line to the collector line at the street. Hereinafter, such combined wastewater will be termed "sanitary effluent". Some municipal sewer systems combine and carry in the same pipes the sanitary effluent from buildings, storm water from outside drains and any ground water leaking into the system (infiltrated water). Other municipal systems combine and carry in the same lines sanitary effluent from buildings, infiltrated water, and water from downspouts and/or footing drains, while having a separate storm drain system, but which in any case the two systems are interconnected downstream. When the treatment plant and the associated web of pipes are built, the system is sized to process a predetermined number of gallons per unit of time, the maximum flow capacity, including a certain rainfall amount. As additional buildings are connected to the system, less of the predetermined flow capacity is available for storm water. Thus, the system becomes susceptible to rainfall amounts less than the planned certain rainfall amount causing numerous overflows into streams and lakes and backups into buildings through the service lines. Overflows also can occur in systems where the storm water is carried in a separate set of pipes. Such overflows and backups cause serious environmental and health problems.

Also, some sewer systems were designed with less capacity than is required to carry typical rainfall amounts thereby always overflowing during normal rainfalls. Typically, such systems were installed before there was much concern for the effect of the overflow on the environment.

However, no matter what the configuration of an existing sewer system, it either now has or will in the near future have flow capacity problems causing overflows, backups and leaks. Consequently, the local governments responsible for maintaining these sewer systems face enormous expenses to repair or replace the existing pipes and/or add capacity.

SUMMARY OF THE INVENTION

The present invention concerns an apparatus and method for improving the operation of sewer systems while reducing the cost of increasing system capacity. The apparatus according to the present invention includes a first set of sewer lines connected to at least one storm water drain, and/or source of infiltrated water, and/or source of sanitary effluent, and a second set of sewer lines of smaller diameter than said sewer lines of said first set connected to sources of sanitary effluent, the first and second sets of lines being separately connected to a sewerage treatment plant. The second set of sewer lines has at least a portion thereof that extends inside the first set of sewer lines and the first set of sewer lines can be an existing sanitary sewer system. The apparatus can include at least one sanitary effluent process device connected to the second set of sewer lines such as a pumping station, a grinder pump or a vacuum system to assist the flow of the sanitary effluent through the second set of sewer lines. The apparatus can provide the same flow volume in a smaller diameter pipe that is under pressure.

The method according to the present invention includes the steps of: a. providing a first set of sewer lines connected between at least one source of storm water, and/or source of infiltrated water, and/or source of sanitary effluent, and at least one sewerage treatment plant; b. providing a second set of sewer lines connected between a source of sanitary effluent and the sewerage treatment plant; and c. installing at least a portion of said second set of sewer lines in said first set of sewer lines. Step b. can include installing a sanitary effluent collector line spaced from a collector line of the first set of sewer lines and connecting a service line from the source of sanitary effluent to the sanitary effluent collector line. Step c. can include running the sanitary effluent collector line to a manhole associated with the collector line of the first set of sewer lines and connecting the sanitary effluent collector line to a portion of the second set of sewer lines installed in the first set of sewer lines. Step c. can be performed by in situ forming of pipe included in the second set of sewer lines.

A sewer system according to the present invention reduces the size of the pipe required to carry sanitary effluent and/or increases the capacity of the sewerage treatment plant to treat sanitary effluent. Since the storm water and infiltrated water are separated from the sanitary effluent, they may require little or no treatment freeing plant capacity to treat the sanitary effluent. In some cases, treatment plant expansion can be delayed or eliminated.

A combined sewer pipe apparatus according to the present invention, for conveying sanitary effluent and storm water from sources to a treatment plant, includes: a larger diameter first sewer pipe adapted to carry storm water and having an interior surface; a smaller diameter second sewer pipe adapted to carry sanitary effluent and extending through the first sewer pipe adjacent the interior surface; and a fastener means attaching the second sewer pipe to the interior surface of the first sewer pipe, the fastener means including a plurality of fasteners spaced apart along a length of the second sewer pipe and engaging an exterior surface of the second sewer pipe and an adhesive material attaching the fasteners to the interior surface of the first sewer pipe. The apparatus can further include a liner extending through the first sewer pipe, the second sewer pipe being positioned between the interior surface of the first sewer pipe and an exterior surface of the liner. The second sewer pipe can be formed of an HDPE material and the fasteners formed of a suitable plastic that can be adhesively secured to the first sewer pipe.

In alternate embodiments of the present invention, the fasteners are not required. An alternate embodiment combined sewer pipe apparatus for conveying sanitary effluent and storm water from sources to a treatment plant includes: a larger diameter first sewer pipe adapted to carry storm water and having an interior surface surrounding an interior space; a smaller diameter second sewer pipe adapted to carry sanitary effluent and extending through the first sewer pipe at a predetermined position in the interior space; a longitudinally extending positioning means in contact with an exterior surface of the second sewer pipe and the interior surface of the first sewer pipe whereby the positioning means, the second sewer pipe and the interior surface of the first sewer pipe form a pair of longitudinally extending positioning spaces separated from a remainder of the interior space; and a positioning mixture contained in the positioning spaces in contact with the exterior surface of the second sewer pipe to maintain the second sewer pipe in the predetermined position.

The positioning means can be a bladder filled with water and the positioning mixture can be a curable adhesive. The bladder is inflated to maintain the second sewer pipe against the interior surface of the first sewer pipe, the curable adhesive material is injected into contact with adjacent portions of the interior surface of the first sewer pipe and the exterior surface of the second sewer pipe, and the bladder is deflated and removed the bladder from the first sewer pipe after the adhesive material is cured enough to maintain the second sewer pipe in the predetermined position.

Alternatively, the second sewer pipe and the positioning means can be formed as an integral unit from a suitable material such as an HDPE material. The positioning mixture can be a slurry mixture that hardens in place. The positioning means can include a semicircular first wall attached to the second sewer pipe and conforming to the first sewer pipe interior surface. The positioning means can include a straight second wall extending between opposed edges of the first wall and attached to the second sewer pipe whereby the first wall, the second wall and the second sewer pipe form the positioning spaces. Alternatively, the positioning means can include a curved second wall extending between opposed edges of the first wall and attached to the second sewer pipe whereby the first wall, the second wall and the second sewer pipe form the positioning spaces. Alternatively, the positioning means can include a pair of arms extending in opposite directions from the second sewer pipe into contact with the interior surface of the first sewer pipe whereby the arms, the second sewer pipe and a portion of the interior surface of the first sewer pipe form the positioning spaces, and another pair of arms extending in opposite directions from the second sewer pipe in the positioning spaces.

A method of installing the combined sewer pipe apparatus according to the present invention includes the steps of: a. inserting into the first sewer pipe a smaller diameter second sewer pipe adapted to carry sanitary effluent and extending the second sewer pipe through the first sewer pipe at a predetermined position adjacent an interior surface of the first sewer pipe; b. providing a positioning means in contact with the interior surface of the first sewer pipe to form at least one longitudinally extending positioning space; and c. inserting a positioning material into the at least one positioning space in contact with an exterior surface of the second sewer pipe to maintain the second sewer pipe in the predetermined position. The positioning means can be formed integral with the second sewer pipe and the method then includes the step of injecting a slurry material as the positioning material whereby the slurry material has a specific gravity high enough to maintain the second sewer pipe in the predetermined position.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENTS

Figure 1:
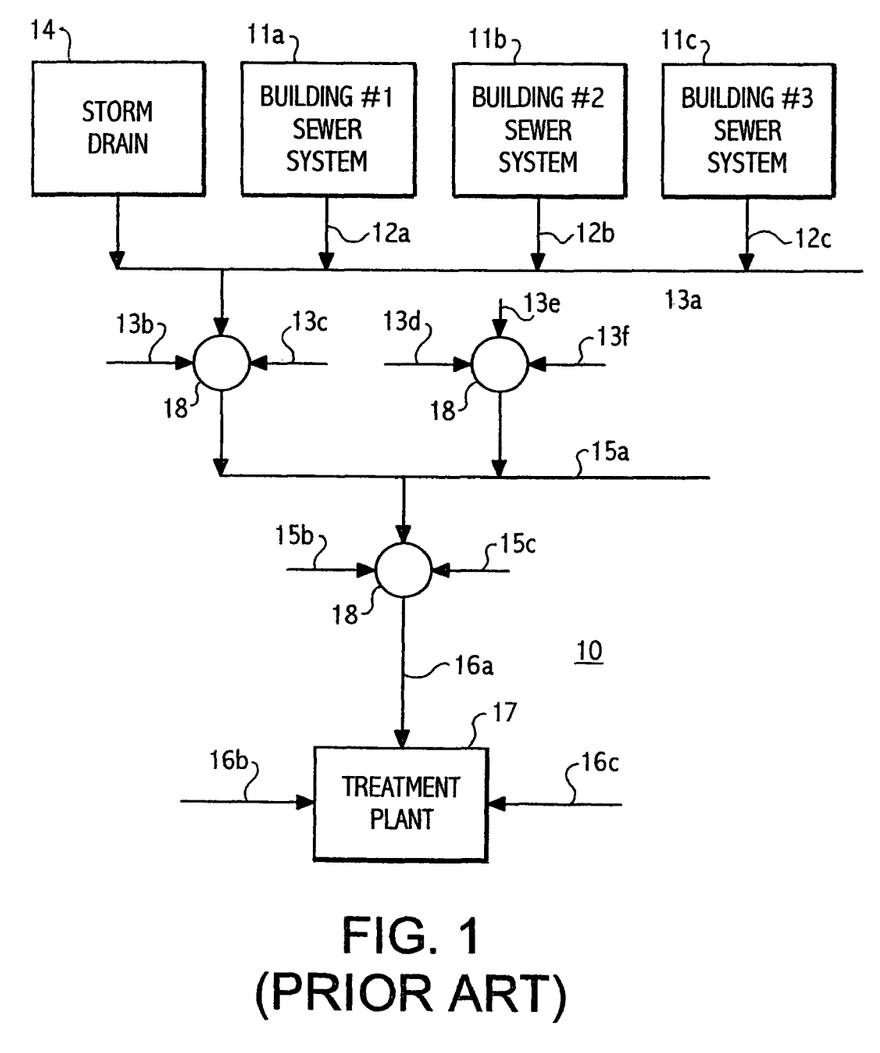
FIG. 1 is a schematic block diagram of a typical prior art sewer system.

There is shown in FIG. 1 a typical sanitary sewer system 10 of known construction. Each one of a plurality of building sewer systems 11a through 11c collects wastewater discharged from sources in the associated building and combines that wastewater as a discharge to a sanitary sewer system. Each one of the building sewer systems 11a through 11c is connected by an associated one of a plurality of service lines 12a through 12c respectively to a collector line 13a. Thus, sanitary effluent from such sources as toilets, and other wastewater such as from sink drains, tub and shower drains, clothes washer drains and floor drains are combined to flow into the collector line 13a. Also, one or more storm drains, such as a storm drain 14, can be connected to the collector line 13a. The collector line 13a and collector lines 13b through 13c feeding from other areas are connected to a trunk line 15a. In a similar manner, other service lines, storm drains and collector lines are connected to trunk lines 15b and 15c. The trunk lines 15a through 15c are connected to an interceptor line 16a leading to a sewerage treatment plant 17 that is connected to other interceptor lines 16b and 16c. Thus, wastewater, including sanitary effluent and storm water combined, flows through the collector lines, the trunk lines and the interceptor lines in a typical sanitary sewer system 10.

While the prior art sewer system 10 is adequate for most conditions, a heavy rain entering the storm drain 14 can cause a problem by exceeding the capacity of the system to carry all of the entering water to the treatment plant 17. Overflow relief devices 18 are provided to release the wastewater from the system into drainage ditches, ponds, rivers and lakes. Although the overflow devices 18 are shown at the junction of the collector lines with the trunk line and the junction of the trunk lines with the interceptor line, the overflow devices can be connected at any suitable points in the sewerage system. A sewerage system operating near capacity may have frequent overflow problems causing contamination of swimming and boating areas with fecal matter and other wastes. Also, exceeding the system capacity causes backup through the service lines 12a through 12c typically flooding buildings with the combined sanitary effluent and storm water. The present invention seeks to solve the overflow and backup problem and increase the water treatment capacity of the sewer system by separating the sanitary effluent from the storm water as both flow through the system.

Figure 2:
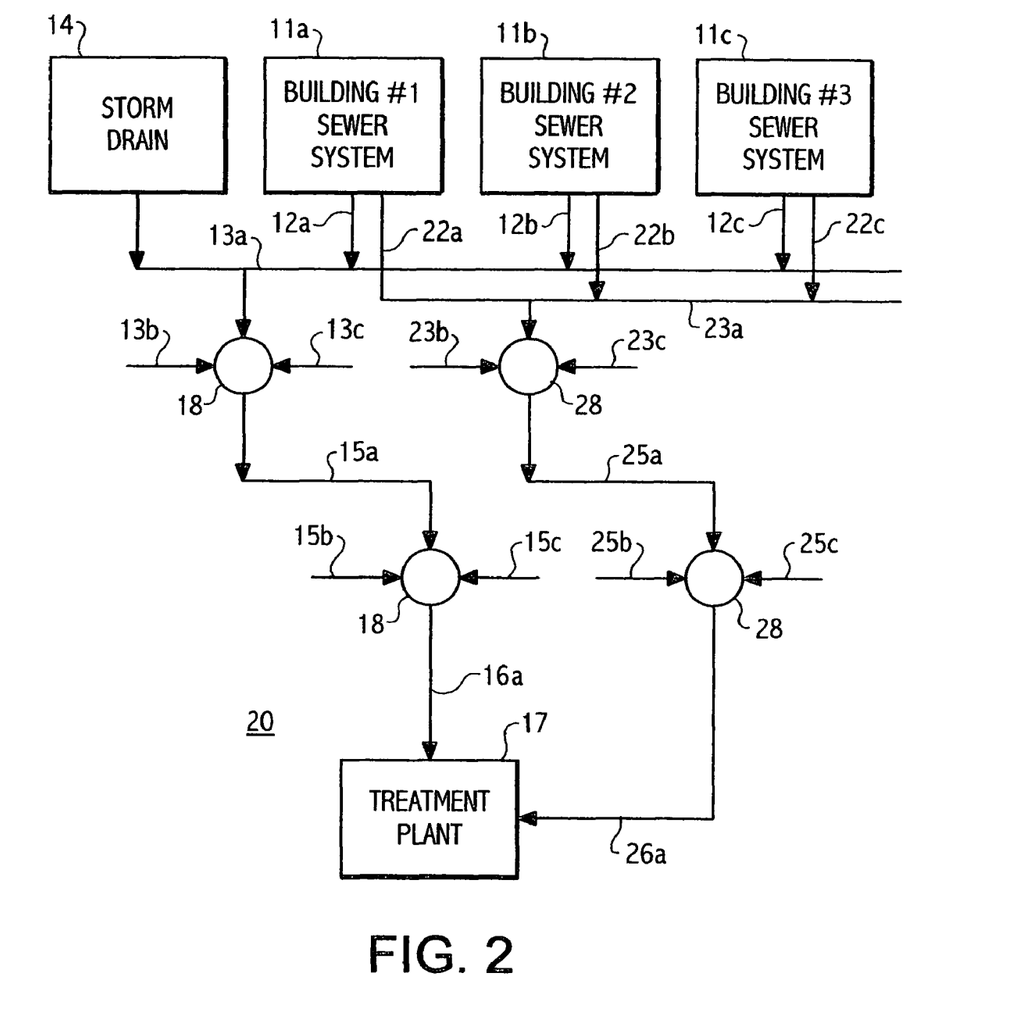
FIG. 2 is a schematic block diagram of a sewer system in accordance with a first embodiment of the present invention.

There is shown in FIG. 2 a first embodiment sanitary sewer system 20 according to the present invention wherein the sanitary effluent is completely separated from the remainder of the building wastewater. As also shown in FIG. 1, each of the building sewer systems 11a through 11c is connected by an associated one of the plurality of service lines 12a through 12c respectively to the collector line 13a. Thus, wastewater from such sources as sink drains, tub and shower drains, clothes washer drains and floor drains is combined to flow into the collector line 13a. However, the sanitary effluent from the toilets is connected to each of a plurality of sanitary effluent service lines 22a through 22c to carry the sanitary effluent to a sanitary effluent collector line 23a separate from the original collector line 13a. While new construction can be built with the required separated plumbing, existing building would require conversion. As an alternative, the new service lines 22a through 22c could be connected to and the old service lines 12a through 12c disconnected from the existing plumbing. Sanitary effluent collector lines 23a through 23c are connected to a sanitary effluent trunk line 25a that is connected to a sanitary effluent interceptor line 26a with other sanitary effluent trunk lines 25b and 25c. The sanitary effluent lines 23a through 23c, 25a through 25c, and 26a are interconnected at connectors 28 that do not require overflow protection. Thus, the sanitary effluent is separated from the other wastewater and will not overflow or back up into the buildings when storm water overloads the system 20.

Figure 3:
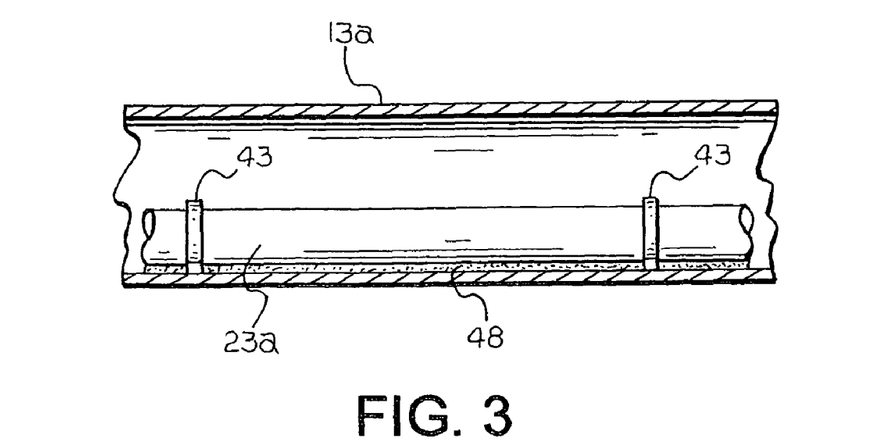
FIG. 3 is a cross-sectional view through one of the collector lines of the system shown in FIG. 2 with a nested sanitary collector line.

Although the sanitary effluent lines 22a through 22c, 23a through 23c, 25a through 25c and 26a could be run parallel to the other lines 12a through 12c, 13a through 13c, 15a through 15c and 16a, it is preferred that sanitary effluent lines run inside the other lines where possible to avoid digging separate trenches. Since existing sewer lines typically run through developed land, the installation of parallel lines can be extremely costly and very disruptive to homes and businesses. Thus, the existing sewer system 10 can be retrofitted with the new sanitary effluent lines. The sanitary effluent pipes will be of a smaller diameter than the corresponding pipes of the existing system 10 since the volume of sanitary effluent wastewater to be carried is less and the addition of pressure increases the flow rate. FIG. 3 shows the smaller diameter sanitary effluent connector line 23a extending inside the larger diameter collector line 13a that now only conveys storm water. Although the line 23a is shown spaced above a bottom of the outer line 13a, such representation is only for the purpose of clearly illustrating two separate lines and the sanitary effluent connector line 23a typically would rest on the bottom of the connector line 13a. Similarly, the sanitary effluent trunk line 25a would run inside the trunk line 15a and the sanitary effluent interceptor line 26a would run inside the interceptor line 16a.

Figure 4:
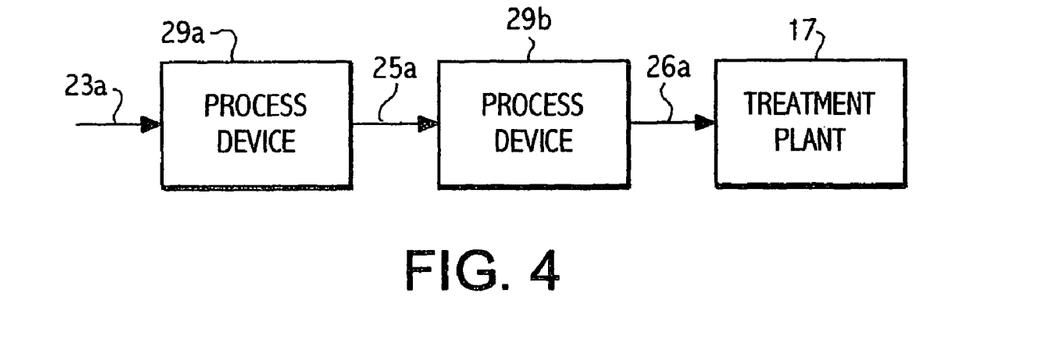
FIG. 4 is a schematic block diagram of a portion of the system shown in FIG. 2 with process devices added.

In order to properly convey the sanitary effluent wastewater to the treatment plant 17, one or more process devices may be required. For example, as shown in FIG. 4, a first process device 29a is connected between the collector line 23a and the trunk line 25a. A second process device 29b is connected between the trunk line 25a and the interceptor line 26a. The process devices 29a and 29b can be pumping stations, grinder pumps, vacuum systems, or any other type of device used to assist the flow through the lines of the sewer system 20. The process devices can be inserted at any point in the sewer system 20 and different types can be used together as required.

Since the flow through the sanitary effluent lines 23a, 25a, and 26a is assisted by pressure or vacuum, the flow rate is greater than in a prior art gravity system for the same diameter pipe. Thus, the cross-sectional area required to flow the same volume is reduced leaving more room in the other wastewater lines 13a through 13c, 15a through 15c and 16a thereby increasing the capacity to carry storm water. When there is an overflow condition, the water escaping from the overflow devices 18 is not contaminated with effluent. Also, the wastewater flowing in the lines 12a through 12c, 13a through 13c, 15a through 15c and 16a either does not have to be treated at the plant 17 or may require only a primary treatment. Thus, another advantage of the present invention is the freeing of significant capacity of existing plants to treat additional wastewater from the sanitary effluent lines and a reduction in the size of new treatment plants.

Figure 5:
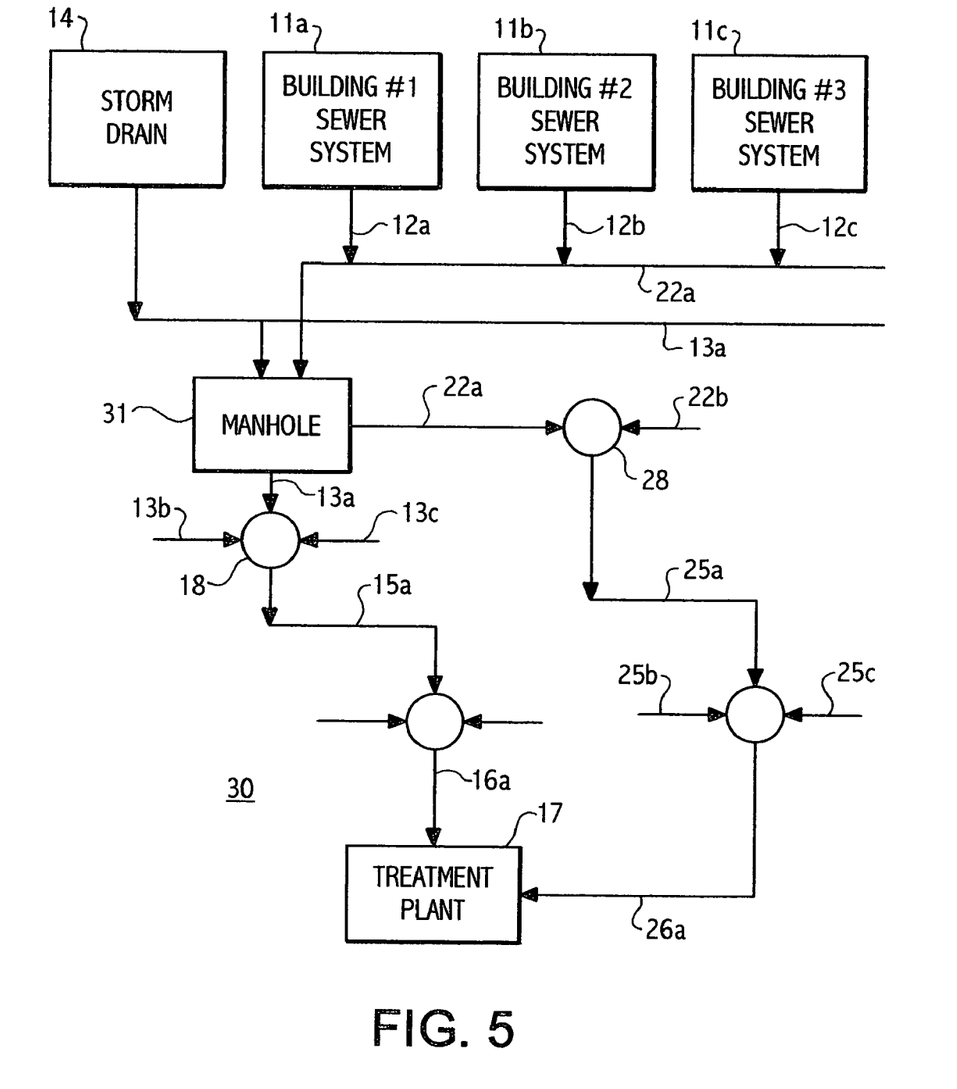
FIG. 5 is a schematic block diagram of a sewer system in accordance with a second embodiment of the present invention.

In some situations, it is desirable not to provide the sanitary effluent service lines 22a through 22c shown in FIG. 2, such as when retrofitting an existing system. There is shown in FIG. 5, a second embodiment sanitary sewer system 30 wherein the service lines 12a through 12c are connected to the sanitary effluent connector line 22a that runs parallel to the collector line 13a. Both of the collector lines 13a and 22a run into a manhole 31 wherein the line 22a can be inserted into the line 13a. From the manhole 31, the sanitary effluent lines run inside the corresponding existing sewer lines as in the system shown in FIG. 2.

The sewer system according to the present invention can be installed as a complete new system or during the repair of an existing system wherein the existing collector, trunk and interceptor lines are used as a first set of sewer lines that are connected to a source of storm water. The sanitary effluent lines according to the present invention are a second set of smaller diameter sewer lines that can be made of any suitable material such as plastic or composition materials and these lines can be placed in sections that are connected together or formed in situ during installation. A sewer system according to the present invention will prevent, or at least reduce overflows, and will eliminate backups into buildings. A sewer system according to the present invention provides a relatively inexpensive way to solve pollution problems and to modernize and expand existing sewer systems.

Figure 6:
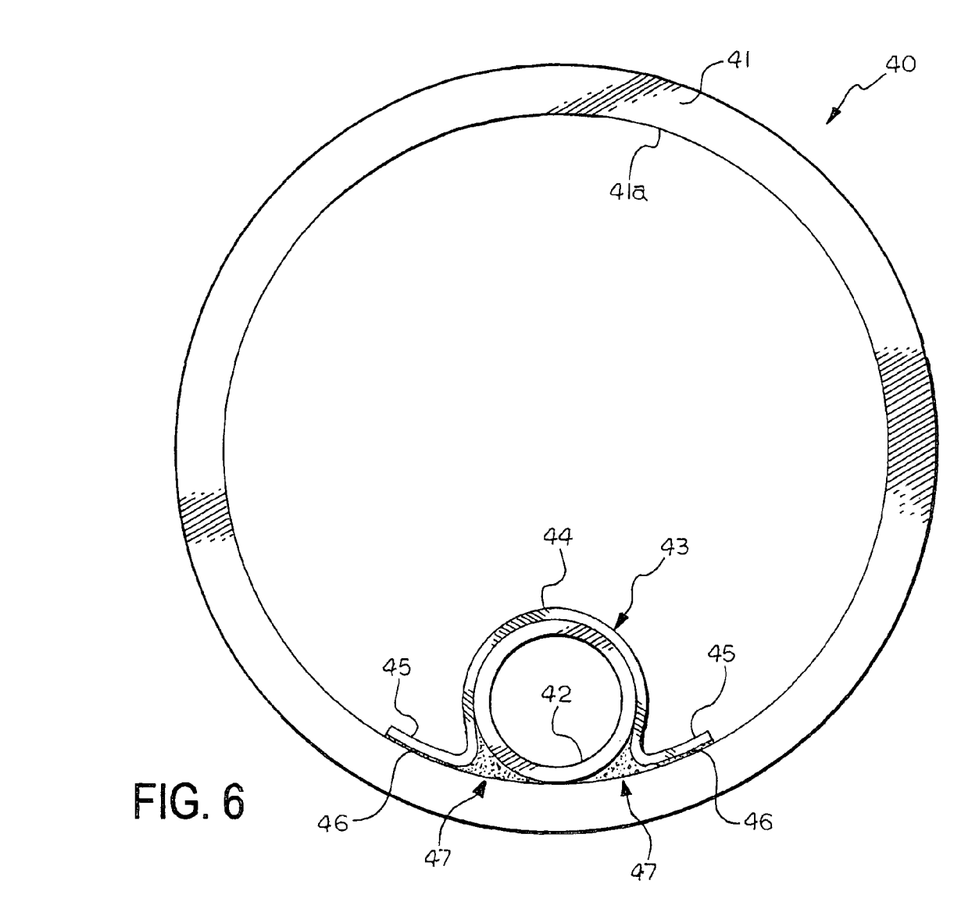
FIG. 6 is an end view of a separated sewer pipe in accordance with the present invention.

There is shown in FIG. 6 a separated sewer pipe 40 according to the present invention for use in the above-described sewer systems. An existing larger diameter combined sewer pipe 41, typically formed of a concrete or steel material, has an interior through which a new smaller diameter sanitary sewer pipe 42 has been inserted. The new pipe 42 can be formed of, for example, a suitable HDPE (high density polyethylene) plastic material. It is desirable to fix the new pipe 42 to an interior surface 41a of the existing outer pipe 41. A fastener 43 is utilized for this purpose and preferably is formed from a molded plastic material or other material suitable for adhesion to the outer pipe 41. The fastener 43 can be of continuous form, extending the length of the pipe 42, or provided as a plurality of fastener straps spaced apart along the longitudinal axis of the pipe 42 at suitable intervals as shown in FIG. 3 being used with the collector line 23a. The fastener 43 can be free or can be attached to the outer surface of the pipe 42 by any suitable means such as adhesive or ultrasonic welding.

The fastener 43 has an arcuate central portion 44 that is curved to engage a part of an outer surface of the pipe 42. Extending from either end of the central portion 44 is an end portion 45 that is shaped to engage a part of the inner surface 41a of the pipe 41. The end portions 45 are attached to the pipe 41 with a suitable adhesive material 46 that adheres to both concrete and plastic and is moisture resistant. The adhesive 46 also can fill spaces 47 surrounded by the facing surfaces of the pipe 41, the pipe 42 and the fastener 43. One adhesive that can be used is a 3M Scotch-Grip Industrial Adhesive 4799 available from 3M Adhesives Division in St. Paul, Minn. In the continuous form, the fastener 43 requires slots or apertures (not shown) formed therein for introducing the adhesive 46 between the end portions 45 and the surface 41a and into the spaces 47.

Figure 7:
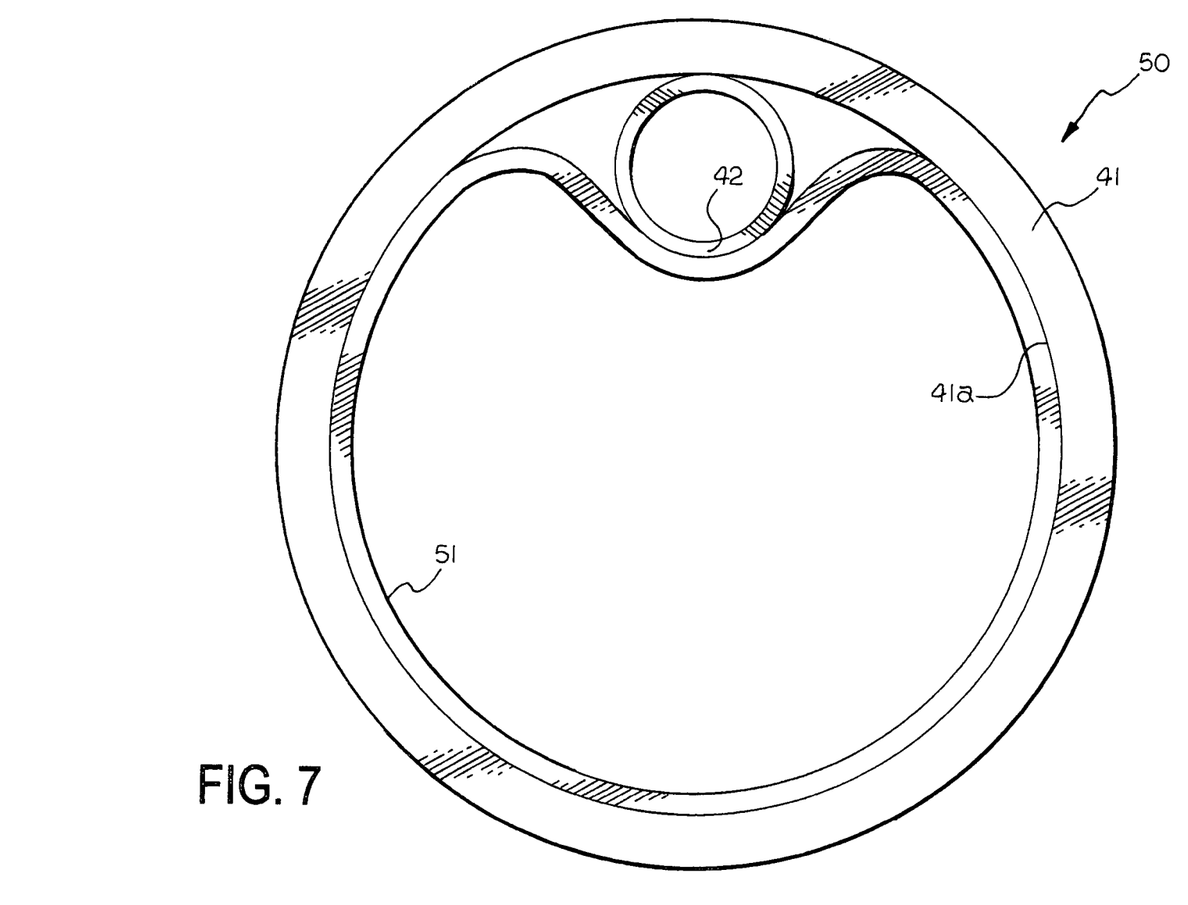
FIG. 7 is an end view of an alternate embodiment separated sewer pipe in accordance with the present invention.

Although the pipe 42 is shown in FIG. 6 as being mounted at the bottom of the interior of the pipe 41, it can be mounted at any desired point along the circumference of the inner wall 41a. For example, in FIG. 7, the pipe 42 is shown mounted at the top of the interior of the outer pipe 41. This mounting can be the same as is shown in FIG. 6 utilizing the hanger 43 and the adhesive material 46. However, FIG. 7 shows a separated sewer pipe 50, according to an alternate embodiment of the present invention for use in the above-described sewer systems. When the existing combined sewer pipe 41 has a rough interior surface 41a and/or is cracked and leaking, it may be desirable to provide a longitudinally extending lining 51. The lining 51 can be inserted into the interior of the existing sewer pipe 41 or can be formed in situ after the new pipe 42 is installed. The lining 51 holds the pipe 42 in place and the hangers 43 and the adhesive 46 are not required.

Although the separated sewer pipes 40 and 50 have been discussed in terms of utilizing the existing combined sewer pipe 41, a new storm sewer pipe can be provided where the old pipe must be replaced or in new construction installations.

Figure 7A:
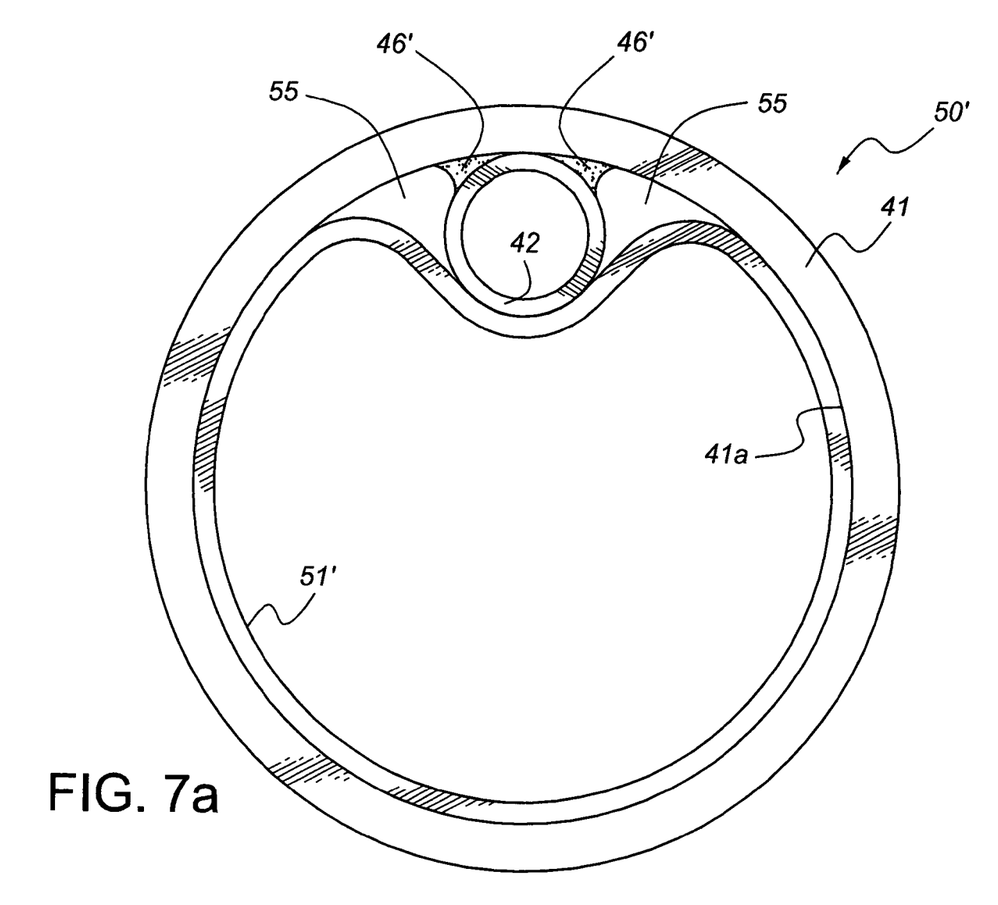
FIG. 7a is an end view of a variation of the separated sewer pipes shown in FIGS. 6 and 7.

As shown in FIG. 3, the fasteners 43 can be used with a grout material or an adhesive material 48 applied along the entire length of the sanitary sewer pipe 23a (42). Furthermore, if the grout/adhesive material alone 48 is a sufficient fastening means, the fasteners 43 can be eliminated. For example, there is shown in FIG. 7a a separated sewer pipe 50', according to a variation of the sewer pipes shown in FIGS. 6 and 7. The sewer pipe 42 is held in place by a positioning material 46' such as a suitable water resistant adhesive. In order to maintain the pipe 42 in place against the interior wall 41a of the existing sewer pipe 41, a longitudinally extending inflatable bladder 51' can be inserted in the pipe 41 and inflated with, for example, water. The bladder 51', the pipe 42 and a portion of the interior surface 41a form two longitudinally extending positioning spaces 55 into which the uncured adhesive 46' is inserted. The bladder 51' holds the pipe 42 in place in a predetermined position while the adhesive 46' cures or dries and then the bladder is deflated and removed. The cured adhesive 46' holds the pipe 42 in place in the predetermined position after the bladder 51' is removed.

Figure 8:
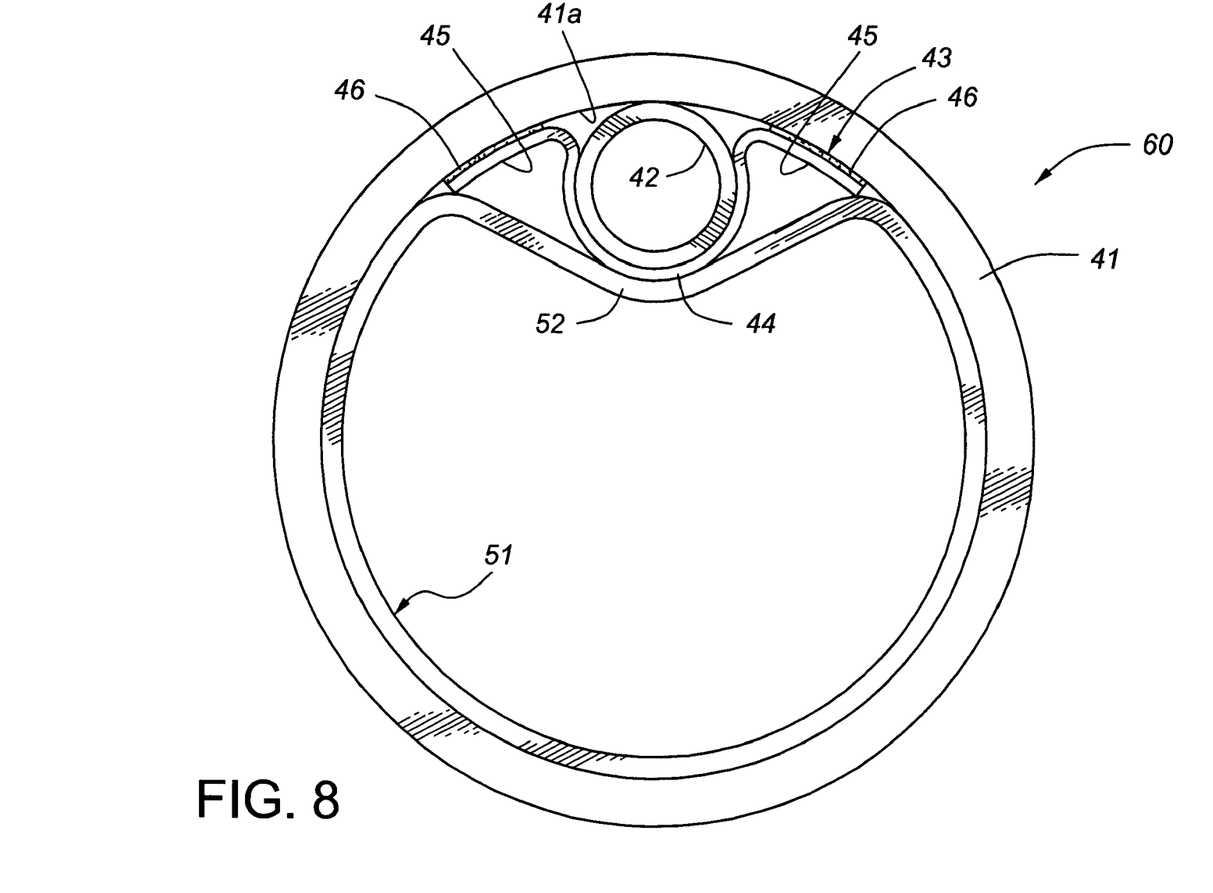
FIG. 8 is an end view of a second alternate embodiment separated sewer pipe in accordance with the present invention.

There is shown in FIG. 8 a separated sewer pipe 60 according to a second alternate embodiment of the present invention for use in the above-described sewer systems. The larger diameter pipe 41 has an interior through which the smaller diameter sanitary sewer pipe 42 has been inserted. The fastener 43 is preferably extruded from a plastic material and can be of continuous form, extending the length of the pipe 42, or provided as a plurality of fastener straps spaced apart along the longitudinal axis of the pipe 42 at suitable intervals as shown in FIG. 3 being used with the collector line 23a. The fastener 43 can be free or can be attached to the outer surface of the pipe 42 by any suitable means such as adhesive or ultrasonic welding.

The fastener 43 has an arcuate central portion 44 that is curved to engage a part of an outer surface of the pipe 42. Extending from either end of the central portion 44 is an end portion 45 that is shaped to engage a part of the inner surface 41a of the pipe 41. The end portions 45 are attached to the pipe 41 with a suitable adhesive material 46 that adheres to both concrete and plastic and is moisture resistant. In the continuous form, the fastener 43 requires slots or apertures (not shown) formed therein for introducing the adhesive 46 between the end portions 45 and the surface 41a.

Although the pipe 42 is shown in FIG. 8 as being mounted at the top of the interior of the pipe 41, it can be mounted at any desired point along the circumference of the inner wall 41a. For example, in FIG. 6, the pipe 42 is shown mounted at the bottom of the interior of the outer pipe 41. When the existing combined sewer pipe 41 has a rough interior surface 41a and/or is cracked and leaking, it may be desirable to provide the lining 51. The lining 51 can be inserted into the interior of the existing sewer pipe 41 or can be formed in situ after the new pipe 42 is installed. The wall of the lining 51 extends inwardly around the pipe 42 and the fastener 43.

Figure 9:
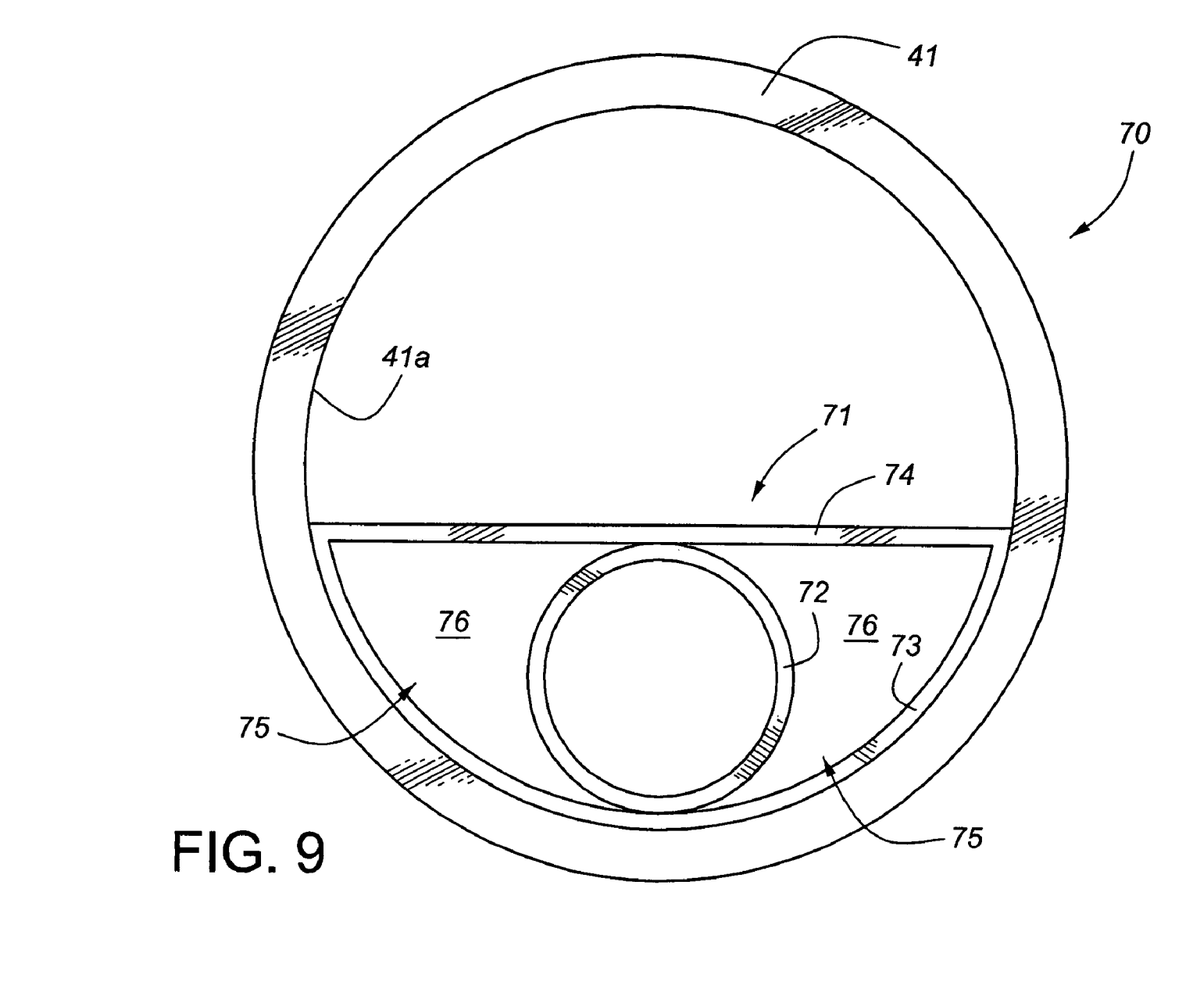
FIG. 9 is an end view of a third alternate embodiment separated sewer pipe in accordance with the present invention.

There is shown in FIG. 9 a separated sewer pipe 70 according to third alternate embodiment of the present invention for use in the above-described sewer systems. The larger diameter pipe 41 has an interior through which a pipe and positioning assembly 71 has been inserted. The assembly 71 is preferably extruded from a plastic material in continuous form and includes a smaller diameter sanitary sewer pipe 72. The assembly 71 also has a first wall 73 that is curved to conform to a portion of the interior wall 41a of the pipe 41 and is integral with the pipe 72 at a bottom portion thereof. The assembly 71 has a second wall 74 that extends horizontally and is integral with the pipe 72 at a top portion thereof. The adjacent edges of the walls 73 and 74 are joined such that the pipe 72, the first wall 73 and the second wall 74 form two longitudinally extending positioning spaces 75. The spaces 75 are filled with a positioning material 76, such as a high specific gravity slurry mixture, that will harden in place to form an integral unit with the assembly 71. The weight of the slurry mixture 76 will maintain the pipe and positioning assembly 71 in place in a predetermined position at the bottom of the larger diameter pipe 41 without the requirement for fasteners and/or adhesive.

Figure 10:
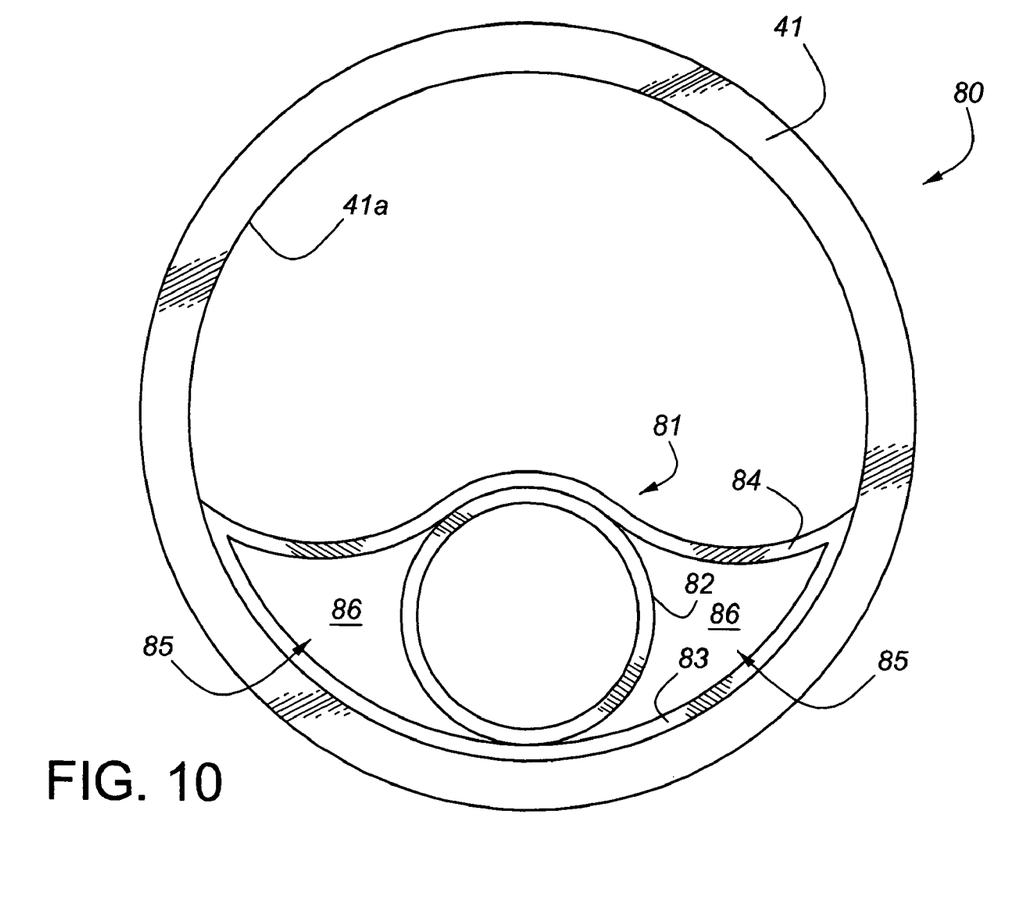
FIG. 10 is an end view of a fourth alternate embodiment separated sewer pipe in accordance with the present invention.

There is shown in FIG. 10 a separated sewer pipe 80 according to fourth alternate embodiment of the present invention for use in the above-described sewer systems. The larger diameter pipe 41 has an interior through which a pipe and positioning assembly 81 has been inserted. The assembly 81 is preferably extruded from a plastic material in continuous form and includes a smaller diameter sanitary sewer pipe 82. The assembly 81 also has a first wall 83 that is curved to conform to a portion of the interior wall 41a of the pipe 41 and is integral with the pipe 82 at a bottom portion thereof. The assembly 81 has a second wall 84 that extends generally horizontally and is integral with the pipe 82 at a top portion thereof. The adjacent edges of the walls 83 and 84 are joined such that the pipe 82, the first wall 83 and the second wall 84 form two longitudinally extending positioning spaces 85. The spaces 85 are filled with a positioning material, such as a high specific gravity slurry mixture, that will harden in place to form an integral unit with the assembly 81. The weight of the slurry mixture 86 will maintain the pipe and positioning assembly 81 in place in a predetermined position at the bottom of the larger diameter pipe 41 without the requirement for fasteners and/or adhesive. In contrast to the wall 74 shown in FIG. 9, the wall 84 follows the curve of the pipe 82 and then extends toward the interior wall 41a curving downwardly and then upwardly before joining the ends of the first wall 83. Consequently, the spaces 85 are smaller in cross section than the spaces 75 proving a larger area of the pipe 41 for carrying storm water.

Figure 11:
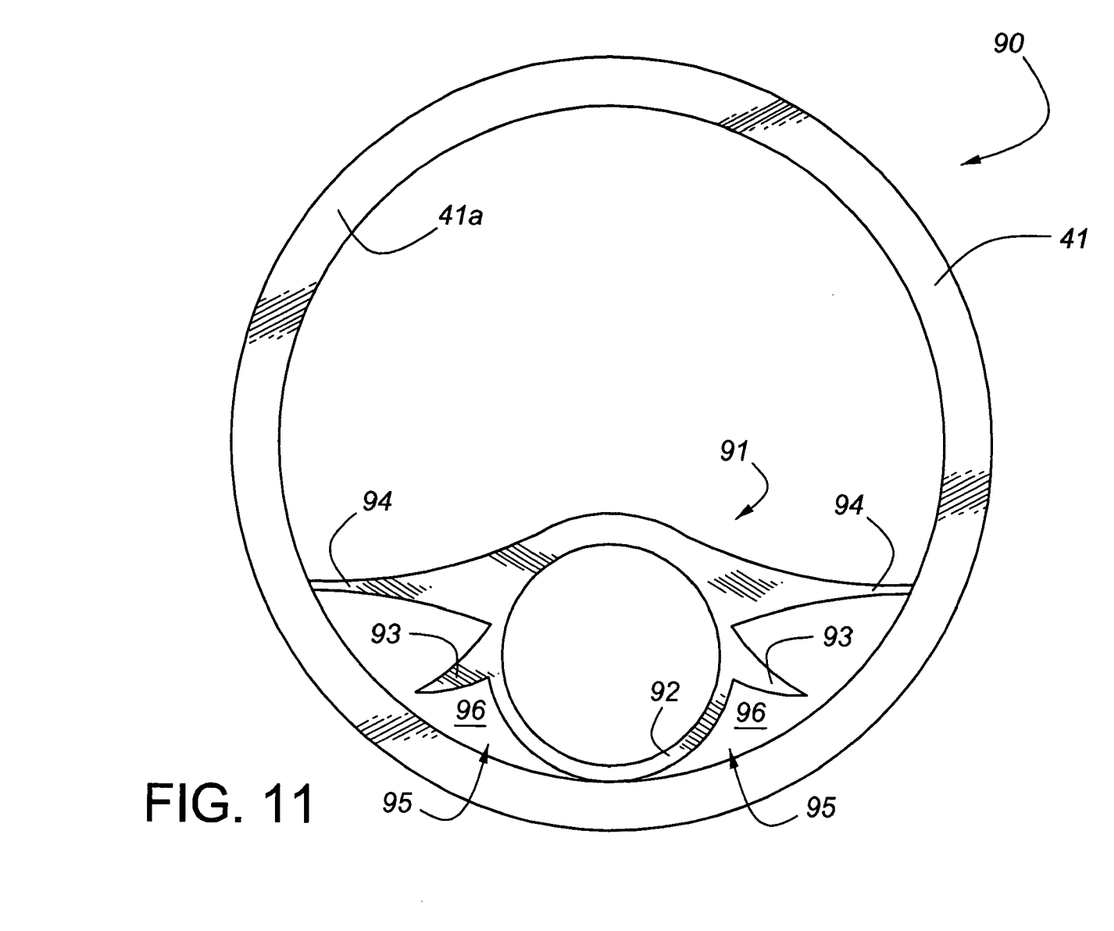
FIG. 11 is an end view of a fifth alternate embodiment separated sewer pipe in accordance with the present invention.

There is shown in FIG. 11 a separated sewer pipe 90 according to fifth alternate embodiment of the present invention for use in the above-described sewer systems. The larger diameter pipe 41 has an interior through which a pipe and positioning assembly 91 has been inserted. The assembly 91 is preferably extruded from a plastic material in continuous form and includes a smaller diameter sanitary sewer pipe 92. The assembly 91 also has a pair of first arms 93 that are integral with the pipe 92. The arms 93 are curved and extend toward but do not contact the interior wall 41a of the pipe 41. The assembly 91 has a pair of second arms 94 positioned above the first arms 93 that are curved and extend to edges in contact with the interior wall 41a. The wall 41a, the pipe 92 and the second arms 94 form two longitudinally extending positioning spaces 95. The spaces 95 are filled with a positioning material, such as a high specific gravity slurry mixture, that will harden in place to form an integral unit with the assembly 91. The weight of the slurry mixture 96 will maintain the pipe and positioning assembly 91 in place in a predetermined position at the bottom of the larger diameter pipe 41 without the requirement for fasteners and/or adhesive.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A combined sewer pipe apparatus for conveying sanitary effluent and storm water from sources to a treatment plant comprising:
   a larger diameter first sewer pipe having an interior surface forming and surrounding an interior space, said first sewer pipe carrying storm water through said interior space in contact with said interior surface;
   a smaller diameter second sewer pipe carrying sanitary effluent and extending through said interior space of said first sewer pipe;
   a positioning means attached to an exterior surface of said second sewer pipe, said positioning means extending along a length of said second sewer pipe and being in continuous form, said positioning means contacting only a portion of said interior surface of said first sewer pipe to form at least one positioning space separated from a remainder of said interior space, wherein said second sewer pipe is disposed inside of said positioning means at a predetermined position at a bottom of said interior space; and
   a slurry mixture contained in said at least one positioning space and having a predetermined specific gravity sufficient to maintain said second sewer pipe in said predetermined position.

2. The apparatus according to claim 1 wherein said second sewer pipe and said positioning means are formed of an HDPE material.

3. The apparatus according to claim 1 wherein said second sewer pipe and said positioning means are formed as an integral unit.

4. The apparatus according to claim 1 wherein said positioning means includes a semicircular first wall attached to said second sewer pipe and conforming to said first sewer pipe interior surface.

5. The apparatus according to claim 4 wherein said positioning means includes a straight second wall extending between opposed edges of said first wall and attached to said second sewer pipe whereby said first wall; said second wall and said second sewer pipe form said at least one positioning space and another positioning space containing said slurry mixture.

6. The apparatus according to claim 4 wherein said positioning means includes a curved second wall extending between opposed edges of said first wall and attached to said second sewer pipe whereby said first wall, said second wall and said second sewer pipe form said at least one positioning space and another positioning space containing said slurry mixture.

7. A combined sewer pipe apparatus for conveying sanitary effluent and storm water from sources to a treatment plant comprising:
   a larger diameter first sewer pipe having an interior surface forming and surrounding an interior space, said first sewer pipe carrying storm water through said interior space in contact with said interior surface;
   a smaller diameter second sewer pipe carrying sanitary effluent and extending through said interior space of said first sewer pipe;
   a positioning means in contact with an exterior surface of said second sewer pipe and said interior surface of said first sewer pipe. said positioning means extending along a length of said second sewer pipe and being in continuous form, wherein said positioning means, said second sewer pipe and only a portion of said interior surface of said first sewer pipe form a pair of longitudinally extending positioning spaces separated from each other and from a remainder of said interior space, wherein said second sewer pipe is disposed inside of said positioning means at a predetermined position at a bottom of said interior space; and
   a positioning mixture contained in said positioning spaces in contact with said exterior surface of said second sewer pipe to maintain said second sewer pipe in said predetermined position.

8. The apparatus according to claim 7 wherein said second sewer pipe and said positioning means are formed of an HDPE material.

9. The apparatus according to claim 7 wherein said second sewer pipe and said positioning means are formed as an integral unit.

10. The apparatus according to claim 7 wherein said positioning mixture is a slurry mixture that hardens in place.

11. The apparatus according to claim 10 wherein said positioning means includes a semicircular first wall attached to said second sewer pipe and conforming to said first sewer pipe interior surface.

12. The apparatus according to claim 11 wherein said positioning means Includes a straight second wall extending between opposed edges of said first wall and attached to said second sewer pipe whereby said first wall, said second wall and said second sewer pipe form said positioning spaces.

13. The apparatus according to claim 11 wherein said positioning means includes a curved second wall extending between opposed edges of said first wall and attached to said second sewer pipe whereby said first wall, said second wall and said second sewer pipe form said positioning spaces.

14. A combined sewer pipe apparatus for conveying sanitary effluent and storm water from sources to a treatment plant comprising:
- a larger diameter first sewer pipe having an interior surface forming and surrounding an interior space, said first sewer pipe carrying storm water through said interior space in contact with said interior surface;
- a smaller diameter second sewer pipe carrying sanitary effluent and extending through said interior space of said first sewer pipe;
- a positioning means of continuous form along a length thereof and being attached to an exterior surface of and extending along a length of said second sewer pipe, said positioning means having a first curved wall conforming to and being in contact with only a portion of said interior surface of said first sewer pipe, said first wall being attached to a second wall not in contact with said interior surface of said first sewer pipe to form at least one positioning space separated from a remainder of said interior space, wherein said second sewer pipe is disposed inside of said positioning means; and
- a slurry mixture contained in said at least one positioning space and having a predetermined specific gravity sufficient to maintain said second sewer pipe in a predetermined position at a bottom of said first sewer pipe.

* * * * *